United States Patent [19]

Nussbaumer

[11] 4,063,082

[45] Dec. 13, 1977

[54] DEVICE GENERATING A DIGITAL FILTER AND A DISCRETE CONVOLUTION FUNCTION THEREFOR

[75] Inventor: Henri Nussbaumer, LaGaude, France

[73] Assignee: International Business Machines Corporation, Armonk, N.Y.

[21] Appl. No.: 665,473

[22] Filed: Mar. 10, 1976

[30] Foreign Application Priority Data

Apr. 18, 1975 France .................................. 75.12569

[51] Int. Cl.$^2$ .............................................. G06F 15/34
[52] U.S. Cl. ..................................... 364/728; 364/724
[58] Field of Search .......................... 235/156, 152, 181

[56] References Cited

U.S. PATENT DOCUMENTS

| 3,808,412 | 4/1974 | Smith | 235/152 |
| 3,872,290 | 3/1975 | Crooke et al. | 235/152 |
| 3,925,646 | 12/1975 | Richardson et al. | 235/152 |
| 3,926,367 | 12/1975 | Bond et al. | 235/181 |

OTHER PUBLICATIONS

J. L. Shanks and T. W. Cairns, "Use of a Digital Convolution Device to Perform Recursive Filtering and the Cooley-Tukey Algorithm" *IEEE Trans. on Computers*, Oct. 1968, pp. 943-949.

*Primary Examiner*—David H. Malzahn
*Attorney, Agent, or Firm*—Delbert C. Thomas

[57] ABSTRACT

A digital filter is described which is based on the use of the so-called primitive roots transform and its inverse. This transform converts a series of binary numbers $\{a_n\}$ into a transformed series $$A_k = ((\sum_{n=i}^{p-i} a_n ((g^{nk}))))$$

where $g$ is a primitive root of a prime number $p$, and the values between superfluous parentheses are taken modulo $p$. Said filter is provided with input means for applying fixed length data blocks made of a group of input samples appended with an equal number of zeros to the input of at least one circular convolutor. This convolutor is provided with accumulating means for generating multiples of each $a_n$ term, adding means for generating said $A_k$ terms by adding successively provided multiples of $a_n$ to selected partial terms of $A_k$, and means for storing said partial $A_k$ terms as they are formed. There is also a device for storing the Primitive Roots transform $B_k$ of the set of filter coefficients appended with an equal number of zeros, a multiplier means for performing the operation $C_k = A_k \cdot B_k$ modulo $p$, and an invertor for inverting the resulting $C_k$ bits. An inverse transformer having an accumulating means for generating multiples of the terms $C_k$, adding means for generating the terms of the inverse transforms $c_n$ by adding selected multiples of $C_k$ and for storing said terms of said transforms is also provided. The filter also has an adding means for adding inverse transforms deriving from two consecutive blocks to generate a series of output terms representing a filtered signal.

5 Claims, 5 Drawing Figures

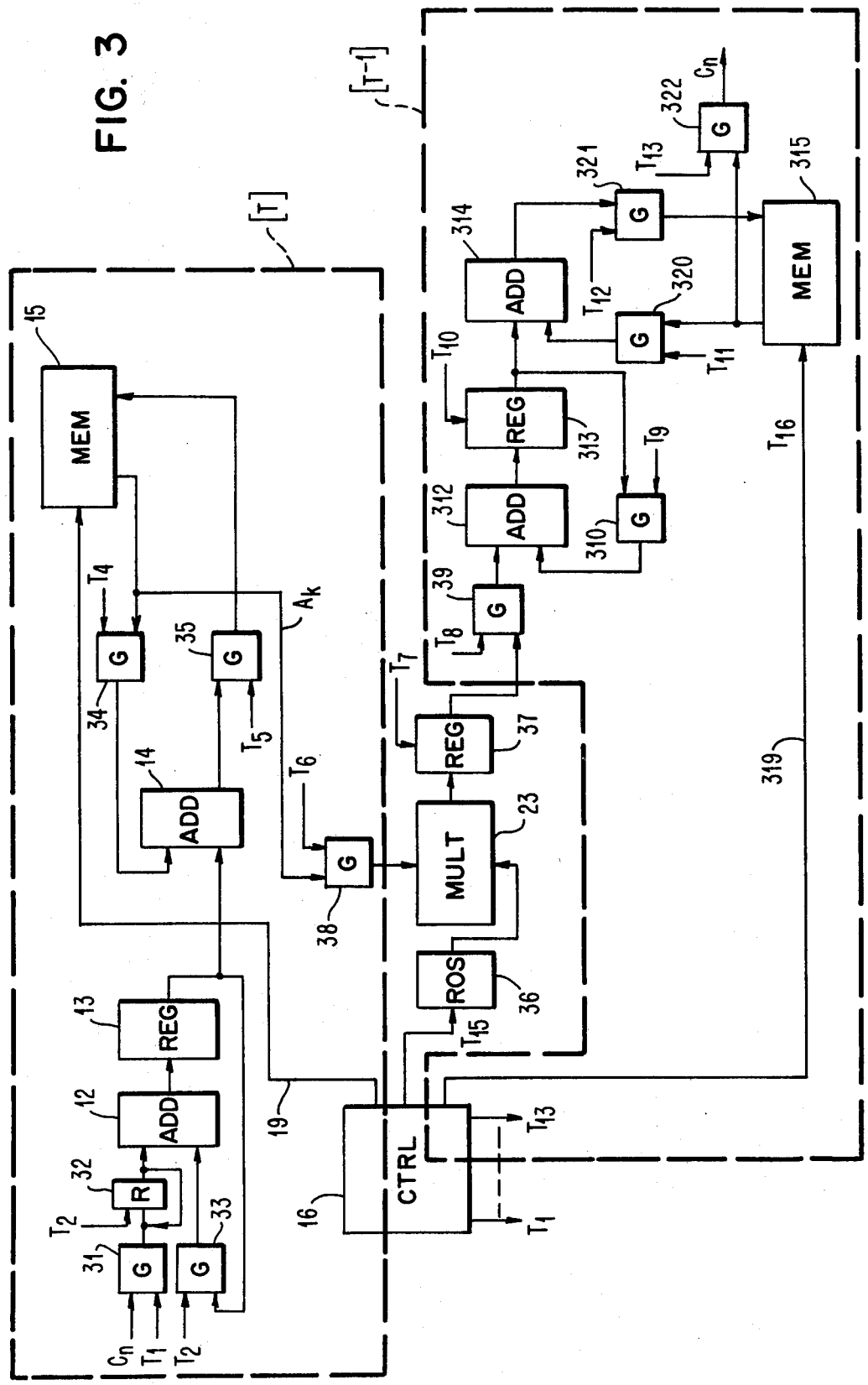

DEVICE GENERATING A DIGITAL FILTER AND A DISCRETE CONVOLUTION FUNCTION THEREFOR

BACKGROUND OF THE INVENTION

This invention relates to convolution function generators and to their utilization in digital filters.

The values of a series of samples $y_n$ of an output signal provided by a filter discretely defined by its set of coefficients $h_n$ and fed by the series of samples $x_n$ of a signal to be filtered are determined by the following convolution relation:

$$y_n = x_n \times h_n = \sum_{m=0}^{N} x_m \cdot h_{n\,m} \quad (1)$$

which shows the need for convolution function generators.

The most obvious manner for building such a device consists in using N+1 multipliers and N adders thus directly performing the operations symbolized by expression (1). However, it is not the least expensive manner, nor the fastest. More especially since the quality of filtering is directly related to N: the greater N is, the better the filtering.

Under such constraints, it is desirable to build filtering devices which require less computing power than this obvious type but give an equivalent filtering quality. For this purpose, consideration was given to the use of the properties of certain mathematical transforms among which, one may mention the Fourier transform or the Mersenne transform described by Charles M. Rader in an article entitled, "Discrete Convolution via Mersenne Transforms," published in the "IEEE Transactions on Computers," Vol. C. 21, No. 12, December 1972, pages 1269-1273. Said Mersenne transform and its inverse show several desirable properties. First of all, term-to-term products in the transform domain correspond to convolutions in the object domain. Otherwise stated, if $X_k$ and $H_k$, respectively, are the transforms of the $x_n$ and $h_n$ terms, and if the term-to-term products $X_k \cdot H_k = Y_k$ are generated, the application of the inverse Mersenne transform to the $Y_k$'s provides the desired $y_n$'s. Thus, the convolution theorem applies to the Mersenne transform. In addition, the transpositions from the object domain to the Mersenne one, and conversely, require only additions and shifts, which is one reason for the interest taken in a convolution function generator based on the properties of the Mersenne transform.

But one of the major disadvantages of such a device rests in the fact that it should be able to process words whose size depends on the number of samples $x_n$ and $h_m$, to which the transforms are applied, thus practically limiting the application of this solution to short convolutions.

French patent application No. 75 12557, filed on Apr. 16, 1975 by the assignee of this invention and corresponding to this applicant's U.S. patent application Ser. No. 670,325, filed Mar. 25, 1976 describes a convolution function generator using a variant of the Mersenne transform, in which the required computing power is still lower than that of a normal Mersenne convolutor. This allows the implementation of convolutors operating on medium length series of terms.

OBJECTS OF THE INVENTION

An object of this invention is to provide a convolution function generator for processing relatively long series of samples.

Another object of this invention is to provide a digital filter using said convolution function generator.

These and other objects, advantages and features of the present invention will become more readily apparent from the following specification taken in conjunction with the appended drawings.

BRIEF DESCRIPTION OF THE DRAWINGS

FIG. 3 is a diagram of the generator according to this invention.

Figure 1:
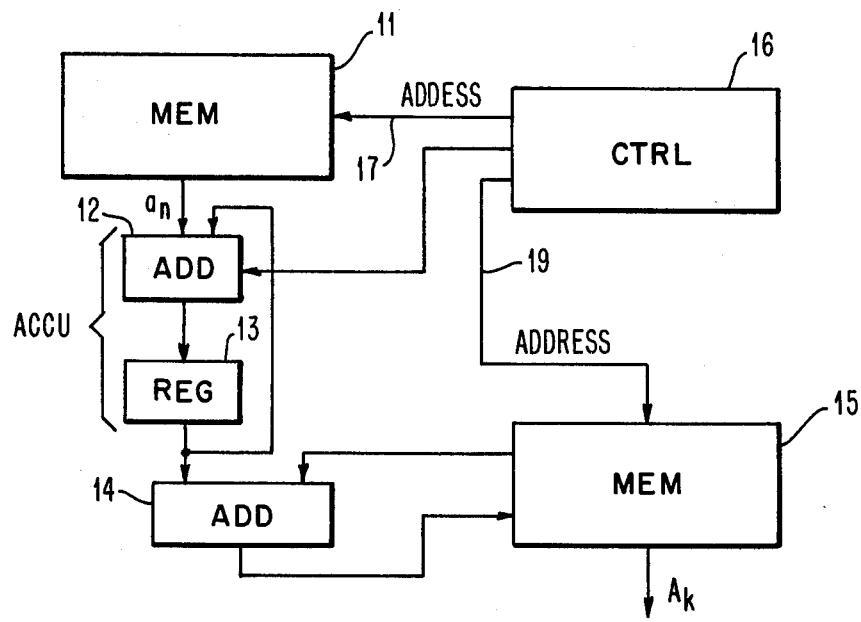
FIGS. 1 and 1A are logic diagrams of devices provided for the invention.

This invention applies some mathematical principles which are more particularly described in the article entitled, "The Fast Fourier Transform in a Finite Field," by J. M. Pollard and published in the "Mathematics of Computation" review, Vol. 25, No. 114, April, 1971, pages 365-374 and in the article entitled, "The Relationship Between Two Fast Fourier Transforms," by I. J. Good and published in the IEEE Transaction on Computers, March, 1971, pages 310-316.

It is to be noted here that if a prime number is referenced $p$, there can be shown to exist one or several numbers $g$ called "primitive roots" of $p$, such that:

$$((g^1)), ((g^2)), \ldots, ((g^{p-1}))$$

forms the entire set of integers between 1 and $p-1$, inclusive. The double parentheses (( )) mean that the operation is performed modulo $p$.

Also, a primitive roots transform [T] is defined to form a sequence $\{A_k\}$ to correspond to the values of a sequence $\{a_n\}$ such that $1 \leq n \leq p-1$, through the following relation:

$$A_k = ((\sum_{n=1}^{p-1} a_n((g^{nk}))))\quad (1)$$

It can be shown that there also exists an inverse transform $[T^{-1}]$ defined by the following relation:

$$a_{<p-1-m>} = (((p-1)\sum_{k=1}^{p-1} A_k((g^{nk}))))\quad (2)$$

with the symbol $<>$ meaning that the operation is performed modulo $p-1$.

And finally, it can also be shown that the convolution theorem applies to this transform. This means that, if we have two series of discrete values $\{a_n\}$ and $\{b_n\}$ to which transform [T] is applied to obtain $\{A_k\}$ and $\{B_k\}$, and then, if we generate the term-by-term products $C_k = ((A_k \cdot B_k))$, the inverse transform $\{c_u\}$ of the $\{C_k\}$'s yields the following relation:

$$(3)$$

-continued
$$c_u = ((\sum_{n=1}^{p-1} b_n \cdot a_{<u-n>}))$$

which represents a circular convolution.

A convolution function generator directly implementing relations (1) to (3) would require an excessive computing power to be economically feasible. However, such a device can be extensively simplified by appropriate use of some of the transform properties involved in this case. For instance, let us assume that we want to build a device such that $p=7$ and $g=3$. Transforms [T] of a series $\{a_n\}$ of $p-1$ words can be written as follows:

$$A_1 = ((3a_1 + 2a_2 + 6a_3 + 4a_4 + 5a_5 + a_6)) \text{ modulo } 7$$

$$A_2 = ((2a_1 + 4a_2 + a_3 + 2a_4 + 4a_5 + a_6))_7$$

$$A_3 = ((6a_1 + a_2 + 6a_3 + a_4 \; 6a_5 + a_6))_7 \quad (4)$$

$$A_4 = ((4a + 2a_2 + a_3 + 4a_4 + 2a_5 + a_6))_7$$

$$A_5 = ((5a_1 \; 30 \; 4a_2 + 6a_3 + 2a_4 + 3a_5 + a_6))_7$$

$$A_6 = ((a_1 + a_2 + a_3 + a_4 + a_5 + a_6))_7$$

wherein coefficients 3, 2, 6, 4, 5, 1 of $A_1$ are $3^1, 3^2, \ldots 3^6$ modulo 7, and the coefficients of the following terms are every second, every third, every fourth, every fifth and every sixth coefficient of a repeating sequence of the first set of coefficients.

As to inverse transforms $[T^{-1}]$ of the $A_k$'s, they are as follows:

$$a_5 = ((6(3A_1 + 2A_2 + 6A_3 + 4A_4 + 5A_5 + A_6)))_7$$

$$a_4 = ((6(2A_1 + 4A_2 + A_3 + 2A_4 + 4A_5 + A_6)))_7$$

$$a_3 = ((6(6A_1 + A_2 + 6A_3 + A_4 + 6A_5 + A_6)))_7 \quad (5)$$

$$a_2 = ((6(4A_1 + 2A_2 + A_3 + 4A_4 + 2A_5 + A_6)))_7$$

$$a_1 = ((6(5A_1 + 4A_2 + 6A_3 + 2A_4 + 3A_5 + A_6)))_7$$

$$a_6 = ((6(A_1 + A_2 + A_3 + A_4 + A_5 + A_6)))_7$$

Figure 1A:
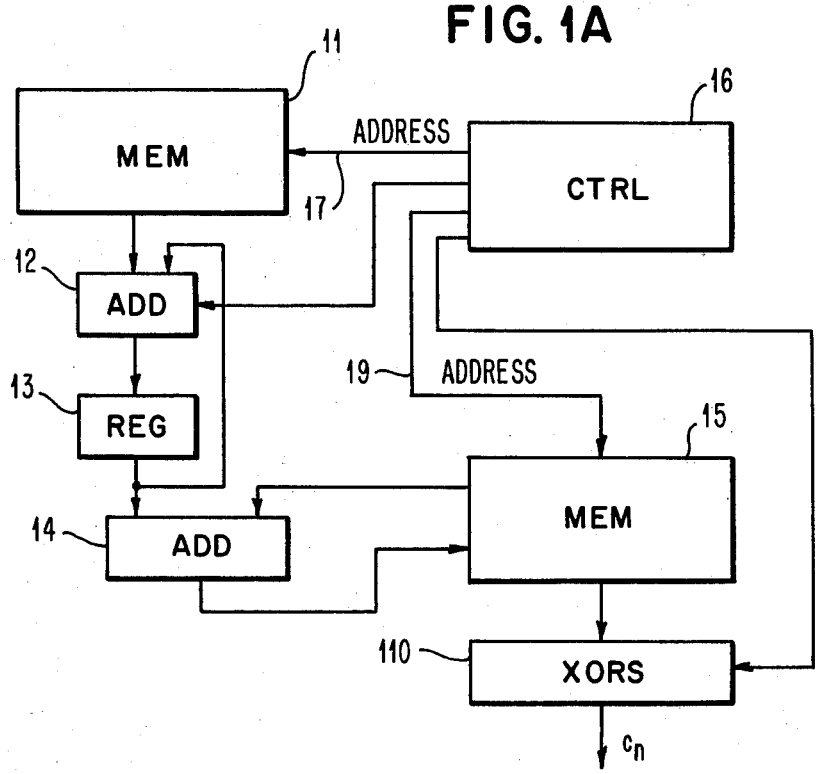

Instead of separately computing terms $A_k$, we can use the fact that they result from an accumulation of terms $\{a_n\}$ each provided with an integer coefficient comprised between 1 and $p-1$. Therefore, we may use the device schematically shown on FIG. 1 and provided with a memory 11, an accumulator ACCU including in particular an adder 12 and a register 13, a second adder 14, a memory 15 and a control device 16. Initially, terms $\{a_n\}$ are loaded into memory 11 and are fed from the output of memory 11 in a repetitive manner under the control of addresses sent on line 17 by control 16, to be introduced into adder 12. On starting, the term $a_1$ is transferred from memory 11 into adder 12 and from there, into register 13 without modification. Then, it goes to adder 14 without modification and from this adder, it is transferred into memory 15 in the register position assigned to term $A_6$ and addressed at that time by control 16 over address line 16. During the transfer from register 13 to adder 14, $a_1$ is also fed back to a second input of adder 12, the first input of which receives a $a_1$ again in order to form $2a_1$ which is passed through adder 14 and is stored into memory 15 in the storage position assigned to $A_2$ and addressed on line 19. Then the $3a_1, 4a_1, 5a_1$ and $6a_1$ terms are successively built in this way by feeding back the register 13 output and the terms are respectively assigned to storage registers for the $A_1, A_4, A_5$ and $A_3$ terms. Then, memory 11 provides the $a_2$ term of six consecutive times so as to allow the formation of terms $a_2, 2a_2, 3a_2, \ldots 6a_2$. These terms are respectively assigned to terms $A_1$ to $A_6$ in accordance with expressions (4). But in this case, $a_2$ is assigned to both $A_3$ and $A_6$; $2a_2$ to both $A_1$ and $A_4$; $4a_2$ to both $A_2$ and $A_5$. To this end, control 16 blocks the addressing of the $a_2$ value in memory 11 while terms $a_2, 2a_2$, or $4a_2$ recirculate in adder 12 and register 13 and addresses the memory 15 two consecutive times to add the recirculating $a_2$ value in two $A_k$ words. Thus, it is shown, by subsequently utilizing terms $a_3$ to $a_6$, the device of FIG. 1 builds the terms of transform [T] of series $\{a_n\}$. Expressions (5) show that the inverse transform $[T^{-1}]$ can be carried out by using a similar device which can be used at the end of the operations. But it should be noted that the device described here operates modulo $p$. Therefore, the multiplication by $(p-1)$ required for the inverse transform is equivalent to a multiplication by $-1$. If the negative numbers are coded in 1's complement form, the multiplication is very easily carried out by complementing all the bits of the word. To this end, the device of FIG. 1 is completed by a series of XOR logic circuits 10 as in FIG. 1A. An input of each XOR is fed from memory 15 by a bit of the word to be inverted and the other input is set to a logical one by control 16 when complementing is to be performed. The FIG. 1A structure can then be used for either the direct or the inverse transform operation.

Therefore, no multiplier is necessary, neither in the device performing the transform [T] nor in the one provided for $[T^{-1}]$. The only operations to be carried out are the repetitive additions. The number of additions set out above for each transform can be further reduced since, when $K$ is even ($K=2s$)

$$A_{2s} = ((\sum_{n=1}^{(p-1)/2} (a_n + a_{n+(p-1)/2})((g^{2ns}))))\quad (6)$$

while when $K$ is odd ($K=2s-1$), the multiplication of a number by $(p-x)$ modulo $p$ is equivalent to a multiplication by $-x$, whereby $$A_{2s-1} = ((\sum_{n=1}^{(p-1)/2} (a_n - a_{n+(p-1)/2})((g^{n(2s-1)}))))\quad (7)$$

The similarity of expressions (1) and (2) allows the application of formulae (6) and (7) to the inverse transform also. It is then possible to reduce by one-half the number of accumulations to be carried out by the devices for the transforms [T] and $[T^{-1}]$.

Figure 2:
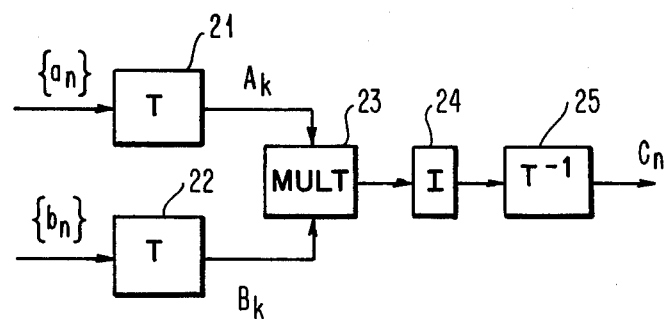
FIG. 2 is a functional diagram of a convolution function generator.

To execute the circular convolution of two series of terms $\{a_n\}$ and $\{b_n\}$, the terms are fed to transformers 21 and 22, each as in FIG. 1, FIG. 2, for computing terms $A_k$ and $B_k$. Then, a multiplier 23 carries out the generation, term by term, of the products $((A_k \cdot B_k))$ to which a gain factor $(p-1)$, modulo $P$, is applied by an inverter 24. At the output, an inverse transformer 25 receives the product terms and provides the following desired terms:

$$c_n = ((\sum_{n=0}^{p-1} a_m \cdot b_{<n-m>}))$$

In many applications, and particularly in the filtering area, terms $\{b_n\}$ will form a series of known fixed values. Then transform 22 is unnecessary as it can be replaced by a memory in which the values of the terms $(p-1) \{B_k\}$ are previously stored.

FIG. 3 shows a more detailed embodiment of the convolution function generator or convolutor of FIG. 2 in which the transforms of terms $\{b_n\}$ normalized by coefficient $(p-1)$ have been previously stored. The terms of the $\{a_n\}$ series are introduced into an adder 12 through a gate 31 which is opened at time $T_1$ and a recirculator 32 operating for $(p-1)$ recirculations of each term $a_n$ during $T_2$ time. The adder 12 is connected to a register 13 which feeds a gate 33 open at time $T_2$ and forms an accumulator building the terms $a_n$, $2a_n$, $3a_n$, ..., $(p-1)$ $a_n$. The terms built in this way are transmitted as they are produced, to a modulo $p$ adder 14. A second input of adder 14 is fed by memory 15 with partial $A_k$ terms through a gate 34 open during time $T_4$. The feeding back from adder 14 to memory 15 of the new $A_k$ term is performed through a gate 35 open at time $T_5$. To complete a converter [T], control circuit 16 is used to provide through line 19, the required addresses of the $A_k$ terms according to expression (4) and to control the other elements by providing clock pulses T. $T_2$, . . . , to said elements.

In fact, it is possible to use in this case, a memory 15 large enough to store $2(p-1)$ words. In this case prior to the beginning of the building of a series of transforms on terms $\{a_n\}$ by converter [T], memory 15 provides the transforms of the previous series through gate 38 to multiplier 23. The second input of multiplier 23 is fed by a read-only storage 36 containing terms $(p-1)B_k$ representing the transforms of the $\{b_n\}$'s provided with a gain $q=p-1$. Therefore, multiplier 23 provides the terms $(( (p-1) A_k \cdot B_k)) = (( (p-1) C_k))$. These terms are temporarily stored in a register 37 and while transformer [T] processes terms of series $\{a_n\}$, transformer [T$^{-1}$] performs the inverse transform on terms $(( (p-1) C_k ))$ issued from the processing of the previous series $\{a_n\}$. Gates 39, 310, adder 312 and register 313 build by successive accumulations, terms $(( (p-1) C_k ))$, 2 $(( (p-1) C_k ))$, etc. These terms are added to the terms of the inverse transform to which they belong (see expressions (5) ) by using an adder 314, gates 320 and 321 and a memory 315 addressed over a line 319 by control 16. The desired terms $\{c_n\}$ are transmitted to the output of the convolution generator through a gate 322.

The above described convolution function generator of FIG. 3 is particularly suitable for implementing a digital filter. However, it should be noted, first of all, that digital filtering requires the execution of aperiodic convolutions while the convolutor of the invention performs circular convolutions. It will now be shown how this problem can be solved. Let it be assumed that we are to perform digital filtering on a signal $x$ discretely defined by a succession of samples $x_1$. It is known that samples $y_i$ of the filtered signal yield to the following convolution relation:

$$y_i = \sum_{m=i}^{N} x_m \cdot h_{i-m} = \sum_{m=i}^{N} h_m \cdot x_{i-m}$$

in which coefficients $h_m$ are defined from the characteristics of the desired filtering operation.

First of all, it may be assumed that fixed coefficient filtering is to be performed. In such a case, said coefficients form an unvarying series while the $x_i$'s form a random sequence. Let us have, for N=3:

$$y_i = \sum_{m=i}^{3} b_m \cdot x_{i-m}$$

Figure 4:
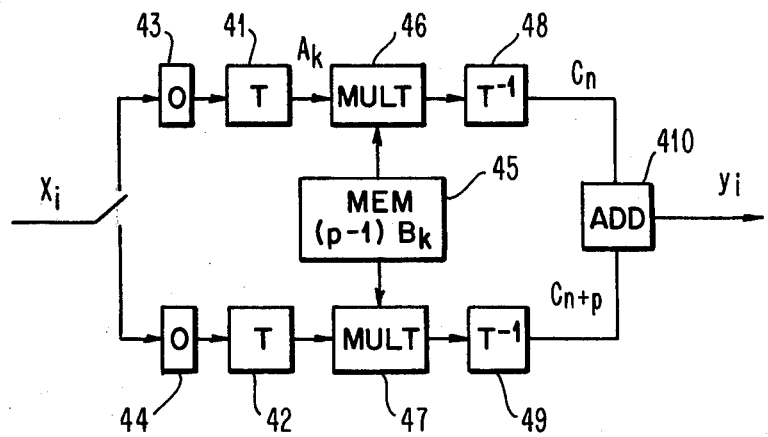
FIG. 4 shows the functional diagram of a digital filter using this invention.

$y_7 = \overline{b_1 x_6 +} \quad b_2 x_5 + b_3 x_4$    1st circular convolution $y_8 = b_1 x_7 + b_2 x_6 + \quad b_3 x_5$ $y_9 = b_1 x_8 + b_2 x_7 + b_3 x_6$ $y_{10} = \overline{b_1 x_9 +} \quad b_2 x_8 + b_3 x_7$    2nd circular convolution $y_{11} = b_1 x_{10} + b_2 x_9 + \quad b_3 x_8$ $y_{12} = b_1 x_{11} + b_2 x_{10} + b_3 x_9$ $y_{13} = \overline{b_1 x_{12} +} \quad b_2 x_{11} + b_3 x_{10}$    3rd circular convolution $y_{14} = \quad\quad\quad\quad + \quad b_3 x_{11}$ Thus it can be seen that the filtering operation can be reduced to a sum of circular convolutions. To this end, if N is the number of coefficients of the desired filter, a series $\{b_n\}$ is formed by using these coefficients each appended with N zeros. The flow samples $x_1$ are split into blocks of N consecutive samples and N zeros are appended to each block. Thus, the terms of the series $\{a_n\}$ are obtained. Circular convolutions between the terms of $\{a_n\}$ and $\{b_n\}$ with $p=2N+1$ are performed and the results of two consecutive convolutions are added to obtain the desired samples. $y_i$. FIG. 4 is a diagram of a structure of this operation. The groups of N consecutive samples are fed to first and second convolution function generators 41 and 42, alternatively, through a device 43 and 44 respectively for appending the N zeros to each sample. Memory 45 containing the values of transforms $B_k$ of coefficients $\{b_n\}$ previously multiplied by $(p-1)$ is common to the two generators. Two multipliers 46 and 47 receiving the outputs of transforms 41 and 42 respectively together with the $(p-1)$ $B_k$ output terms from memory 45 supply the terms of $[C_k]$ and $[C_{k+p}]$ output series respectively, to the inverse transformers 48 and 49 which generate the terms of the output series $c_n$ and $c_{n+p}$. An adder 410 fed by the outputs $c_n$ and $c_{n+p}$ of the two convolution generators 48 and 49, provides samples $y_i$.

It was shown above that the same convolution generator can process two series $\{a_n\}$ provided that memory 15 of transformer [T] can contain $2(p-1)$ words. By giving also this capacity to memory 315 of transformer [T$^{-1}$], see FIG. 3, only one convolutor 48 to which an output adder 410 would be added, would be sufficient to implement a digital filter.

While the invention has been particularly shown and described with reference to the preferred embodiment thereof, it will be understood by those skilled in the art that various changes in form and details may be made therein without departing from the spirit and scope of the invention.

What is claimed is:

1. A device for generating the circular convolution function of two series of values $\{a_n\}$ and $\{b_n\}$ said device including:
   a pair of means, each for generating the primitive root transforms $\{A_k\}$ or $\{B_k\}$ respectively of one of said series $\{a_n\}$ and $\{b_n\}$
   means connected to said pair of means for multiplying term-by-term, the terms of said transforms generated by said pair of means; and
   a third means of generating a series of terms which are a constant multiple $q$ of the terms of the inverse transform of the series of said products from said multiplying means, said device characterized in that at least one of said pair of means generating said primitive root transforms includes:
   a. means for building by successive accumulations, multiples of the terms of the associated one of said series; and
   b. means for building the primitive root transforms of the terms of said associated one of said series by successive and selective accumulations of said multiples.

2. A circular convolution function generator device as set out in claim 1, wherein one of said series of values is a sequence of filter coefficients and characterized in that the associated one of said pair of means includes a memory containing multiples of the primitive root transform of the terms of said associated series where each term of said transform is multiplied by a constant value.

3. A circular convolution function generator device as set out in claim 1 characterized in that said third means for generating the series of terms of the inverse transform includes:
   means connected to said multiplying means for building by successive accumulations, the integral multiples of the terms $q\ C_k = q\ ((A_k \cdot B_k))$ generated by said multiplying means; and
   means connected thereto for developing the inverse transform of the terms of series $\{q\ C_k\}$ by successive and selective accumulations of said multiples.

4. A circular convolution function generator according to claim 1 characterized in that at least one of the means for generating said transforms includes:
   means to recirculate for a set number of circulations each data sample of the series to be transformed;
   an accumulator connected to said recirculating means and selectively receiving said recirculating data samples for building at least some multiples of said data samples of said series;
   a memory for storing partially formed terms of said transforms as said terms are being formed;
   an adder; and
   means for selectively connecting the outputs of said memory and said accumulator to inputs of said adder to combine partially formed terms of said transforms with said multiples of said data samples.

5. A circular convolution function generator comprising:
   means for determining the primitive root transforms of a sequence of terms of a series $\{a_n\}$ and including:
   accumulating means for building at least some of the 1 to $p-1$ multiples of the terms of said series where $p$ is a prime number;
   a first memory for storing partial terms of said transforms as said terms are formed;
   an adder having its output connected as an input of said first memory; and
   means for connecting an output of said memory and the output of said accumulating means to inputs of said adder to selectively combine partial transform terms from said memory with said multiples to form more complete partial terms of said transforms;
   a second memory for storing the negatives of the transforms of the terms of series $\{b_n\}$;
   a multiplying means fed corresponding terms of said transforms of said $\{a_n\}$ series and said negatives of the transforms of said $\{b_n\}$ series by said first and second memories, to generate terms of a transform of a function of said $\{a_n\}$ and said $\{b_n\}$ terms; and
   means for determining the inverse transforms of the transform terms generated by the multiplying means, said means for determining including:
   a second accumulating means for building, at least some of the 1 to $p-1$ multiples of the terms issued by said multiplying means;
   another adder having an input receiving said multiples from said second accumulating means;
   a third memory connected to the output of said other adder for storing partial terms of said inverse transforms as said partial terms are formed in said other adder; and
   gating means for reading out selected ones of said stored partial terms from said third memory to another input of said other adder for addition to selected ones of said multiples from said second accumulator to generate more complete partial terms for storage in said third memory.

* * * * *